(12) United States Patent
Johnson et al.

(10) Patent No.: US 7,561,014 B2
(45) Date of Patent: Jul. 14, 2009

(54) FAST INSERTION MEANS AND METHOD

(75) Inventors: Theodis Johnson, Phoenix, AZ (US); Dennis W. Smith, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1079 days.

(21) Appl. No.: 10/748,974

(22) Filed: Dec. 29, 2003

(65) Prior Publication Data

US 2005/0185241 A1    Aug. 25, 2005

(51) Int. Cl.
*H01H 7/00*   (2006.01)
(52) U.S. Cl. .................. 335/229; 335/177; 359/230
(58) Field of Classification Search ......... 335/220–229, 335/177–179; 359/227, 230
See application file for complete search history.

(56) References Cited

U.S. PATENT DOCUMENTS

| | | | | |
|---|---|---|---|---|
| 4,324,981 A * | 4/1982 | Miller | .......................... | 250/551 |
| 4,533,890 A | 8/1985 | Patel | | |
| 5,166,652 A * | 11/1992 | Koyama et al. | ............. | 335/234 |
| 5,896,076 A * | 4/1999 | van Namen | .................. | 335/229 |
| 5,970,961 A | 10/1999 | Kotwicki | | |
| 6,586,926 B1 * | 7/2003 | Bomya | ................... | 324/207.17 |
| 6,956,453 B2 * | 10/2005 | Osterberg | .................... | 335/229 |
| 6,958,553 B2 * | 10/2005 | Ichii et al. | ...................... | 310/15 |
| 7,013,057 B2 * | 3/2006 | Osterberg | ..................... | 385/16 |
| 2001/0026204 A1 | 10/2001 | Petro | | |
| 2002/0153982 A1 * | 10/2002 | Jones et al. | ................. | 335/220 |

FOREIGN PATENT DOCUMENTS

DE    10310448 A1    9/2003

OTHER PUBLICATIONS

PCT International Search Report: PCT/US2004/042614, May 25, 2005, International Search Authority—EP Patent Office, 6 pages.

* cited by examiner

*Primary Examiner*—Lincoln Donovan
*Assistant Examiner*—Bernard Rojas
(74) *Attorney, Agent, or Firm*—Ingrassia Fisher & Lorenz, P.C.

(57) ABSTRACT

Methods and apparatus are provided for rapidly moving a filter into and out of an optical beam. A shuttle carries the filter at a first end and first and second spaced apart pieces of magnetic material near the other end. A low friction guide-way supports the shuttle. A base supports the guide-way and a third magnetic piece and coil between the first and second pieces. When the shuttle is IN the first and third pieces form a first magnetic latch to releasably hold it IN and when the shuttle is OUT the second and third pieces form a second magnetic latch to releasably hold it OUT. Spring(s) between the shuttle and the base store energy when the shuttle is IN or OUT. Activating the coil weakens the magnetic attraction between the latch pieces, freeing the shuttle to move, driven by the spring(s) to the opposite OUT or IN position.

17 Claims, 10 Drawing Sheets

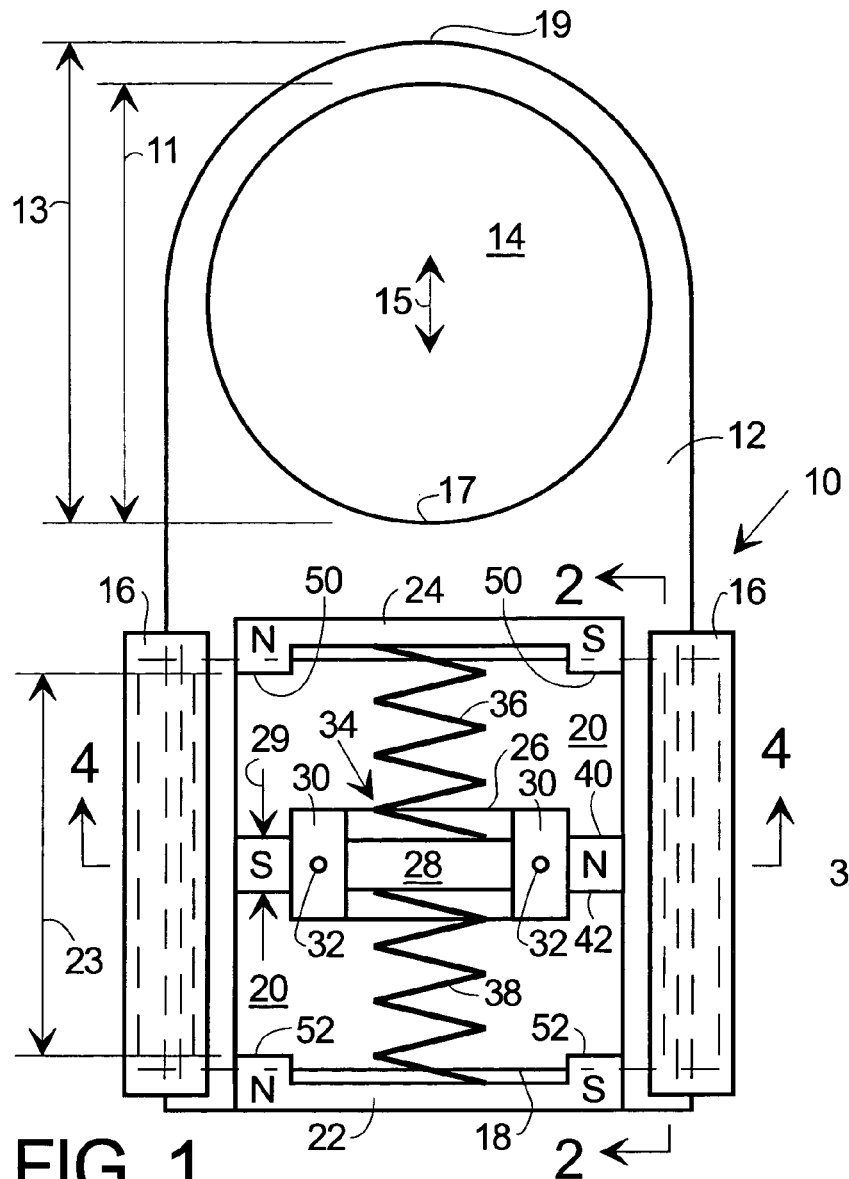
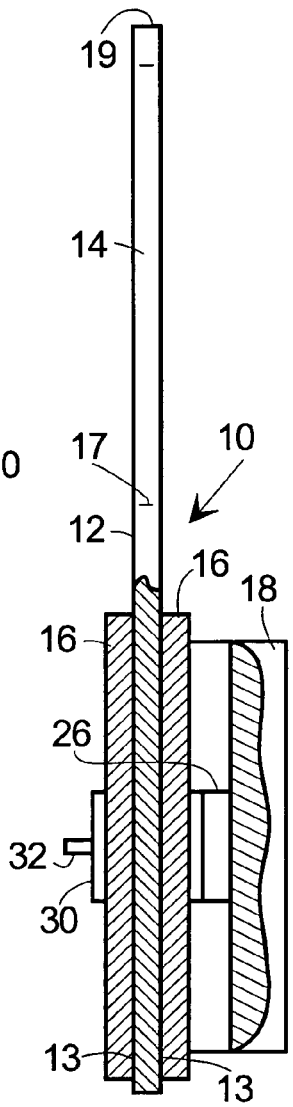
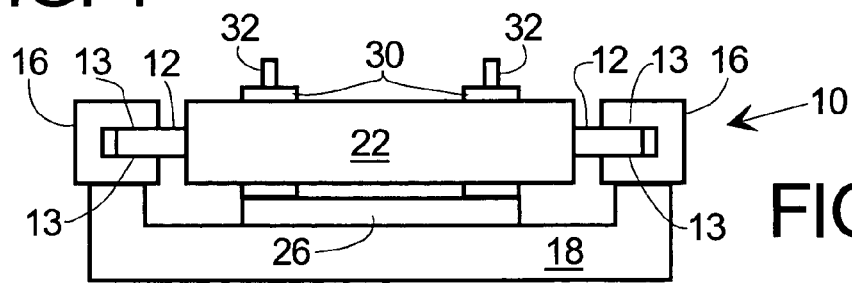
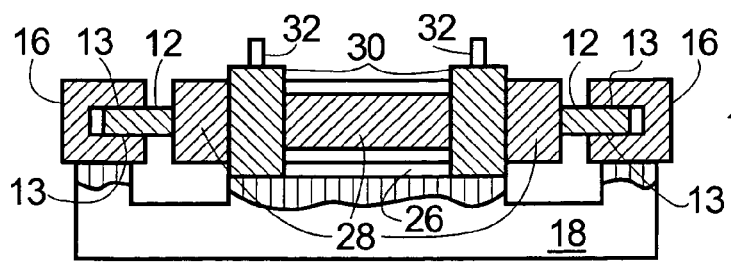
FIG. 1
FIG. 2
FIG. 3
FIG. 4

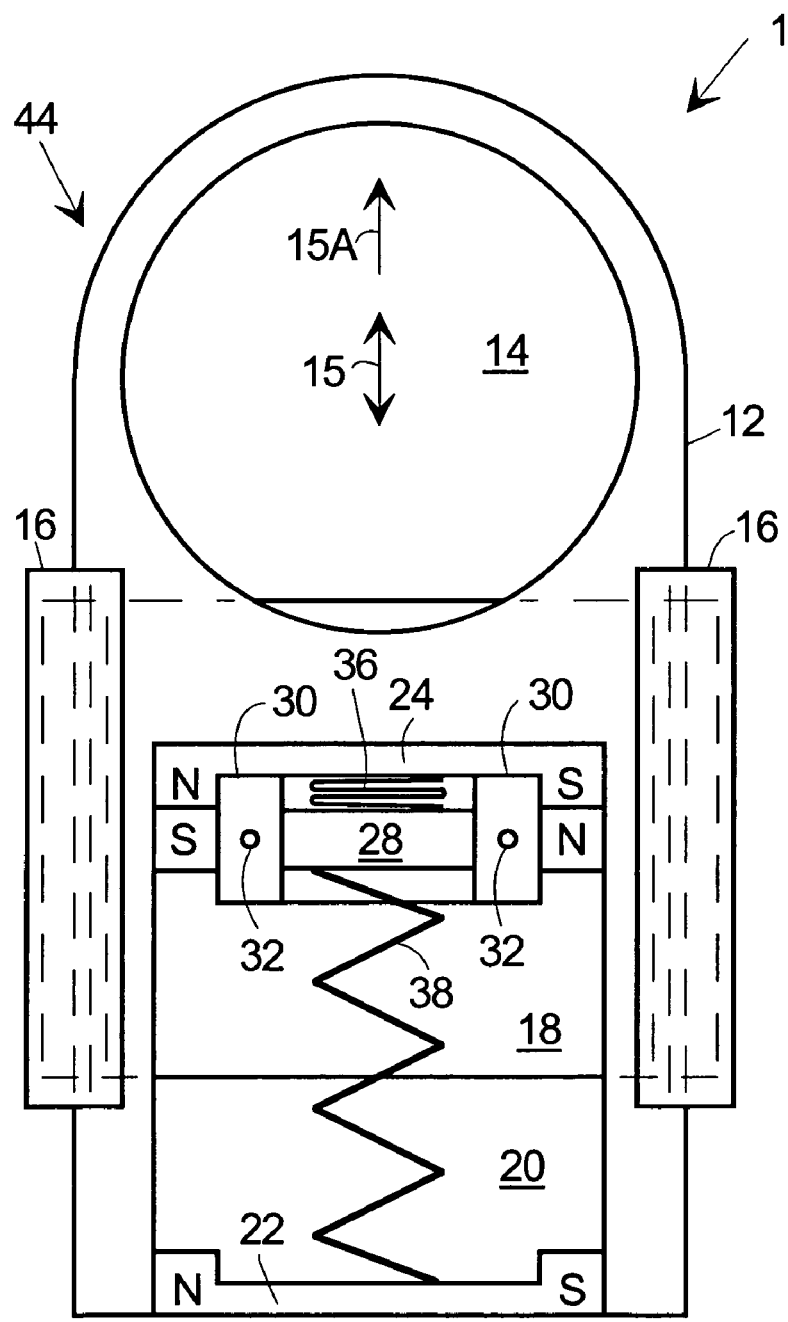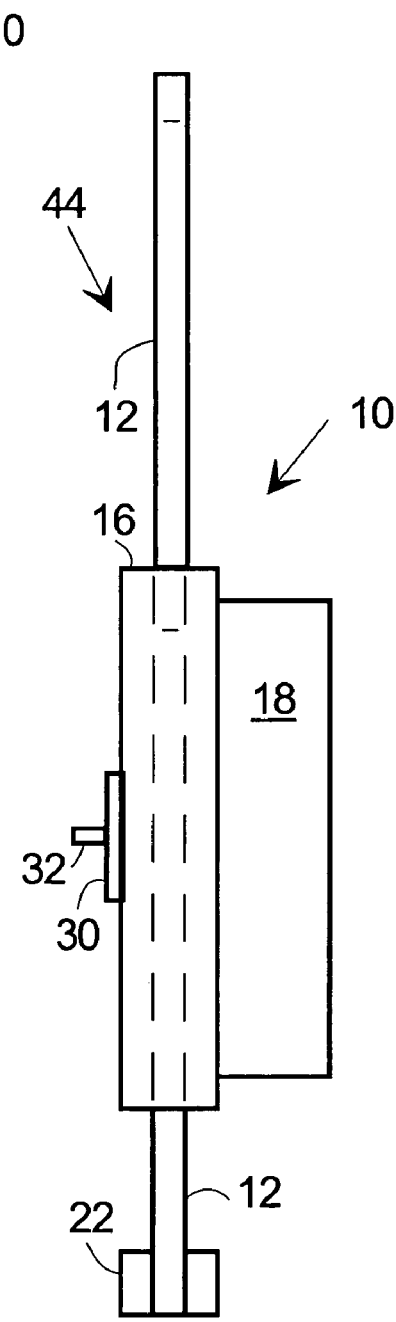
FIG. 5A
FIG. 5B

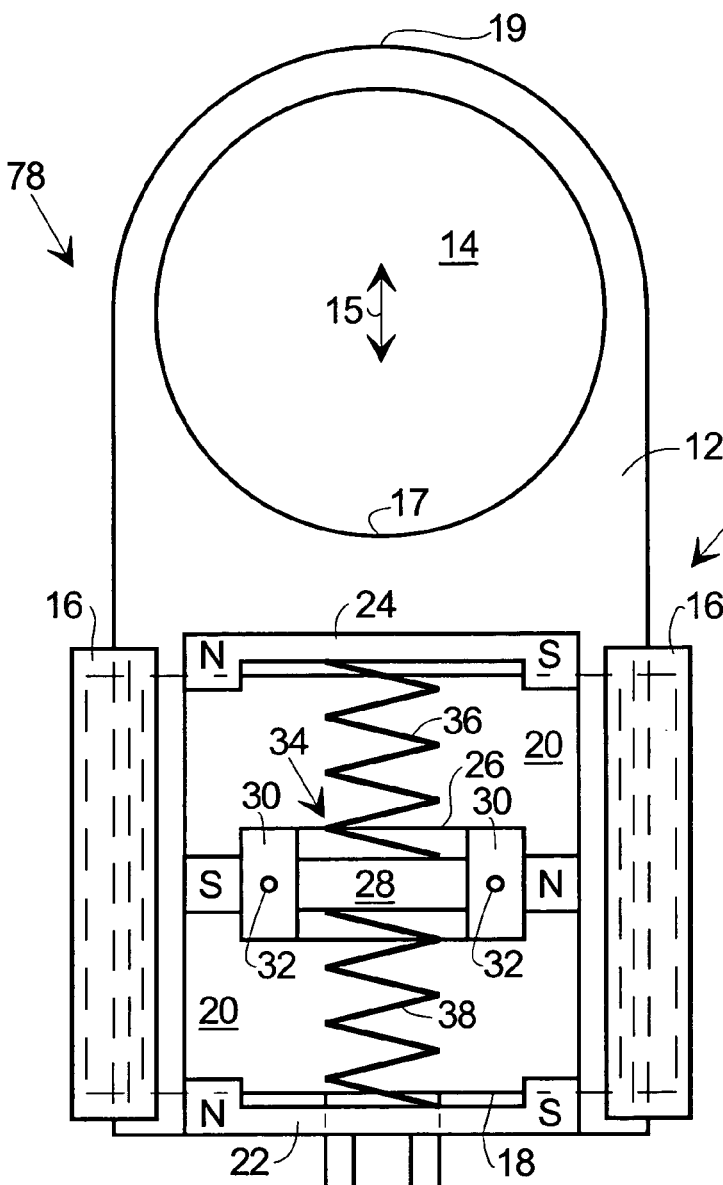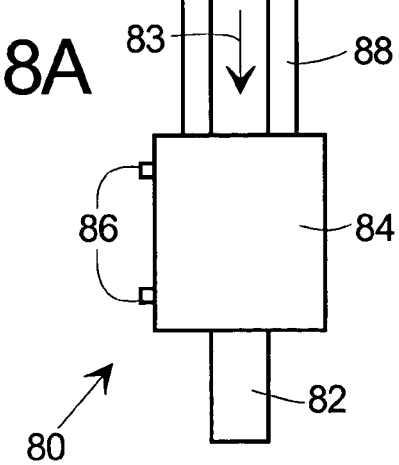
FIG. 8A
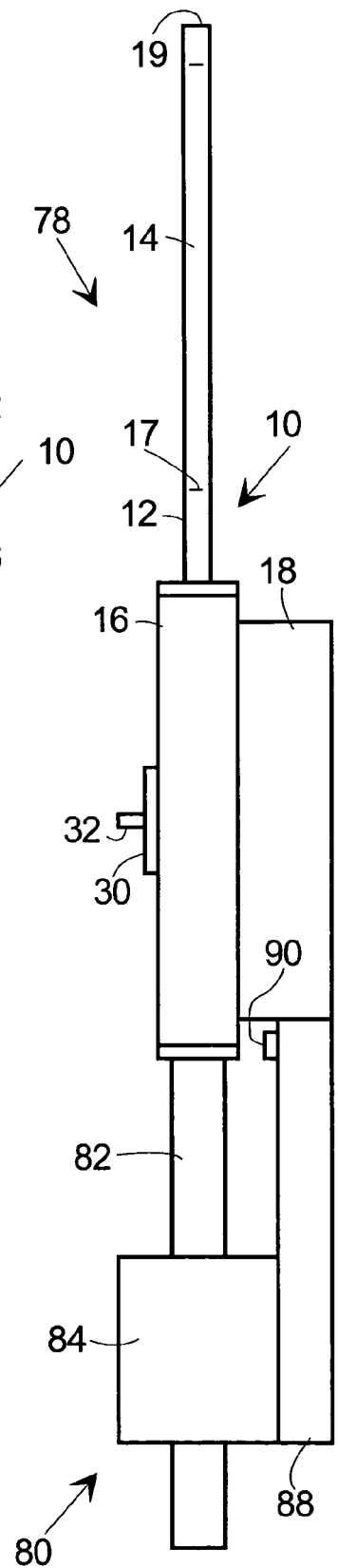
FIG. 8B

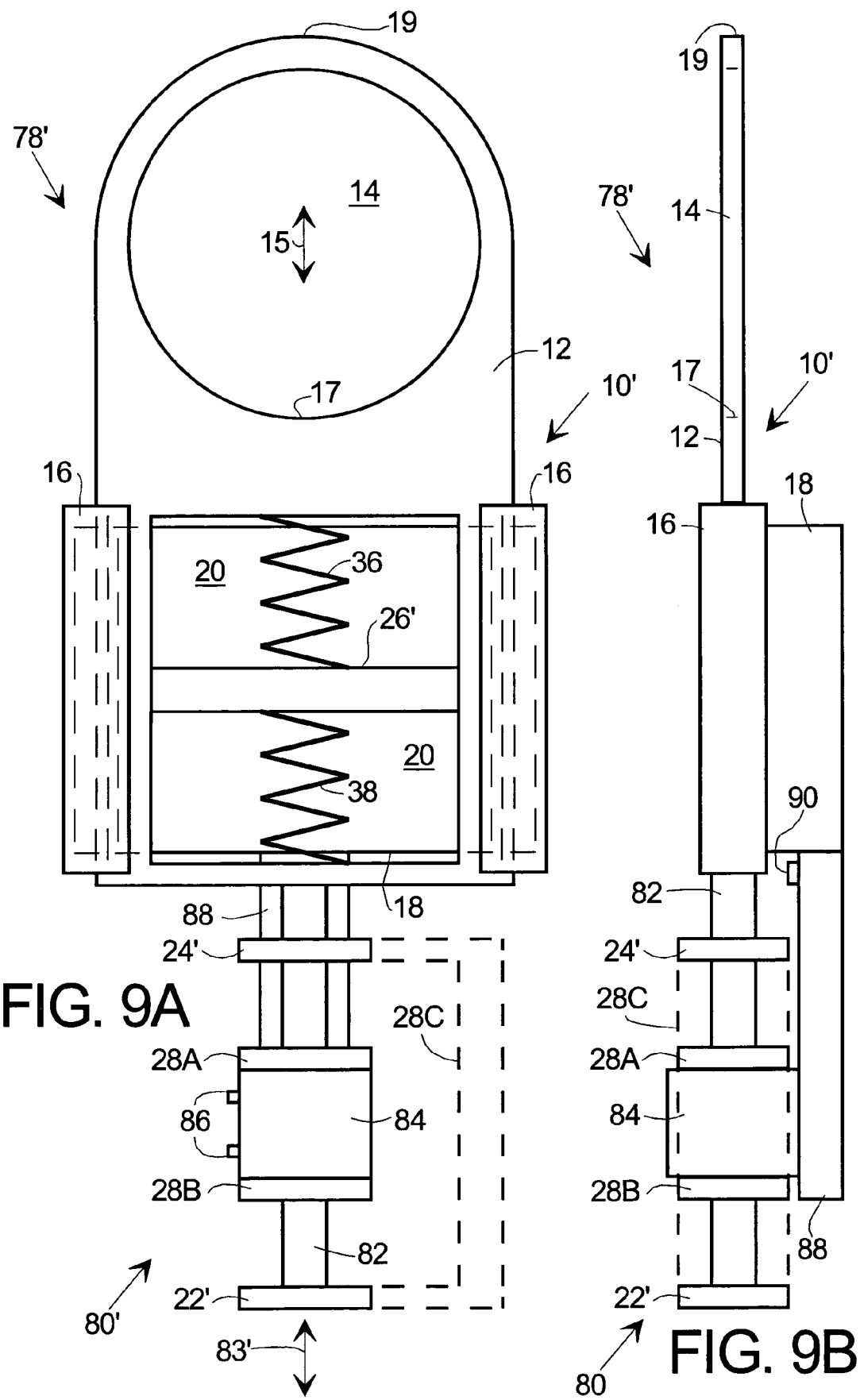

FAST INSERTION MEANS AND METHOD

TECHNICAL FIELD

The present invention generally relates to means and methods for rapid linear translation, and more particularly, for rapidly inserting filters or other components into an optical or other path.

BACKGROUND

Many types of equipment require the temporary insertion (and removal) of filters, lenses, detectors, prisms, screens, isolators and other components. The path into which they are inserted and removed may be an acoustic path or an optical, microwave, x-ray or other electro-magnetic (EM) propagation path For convenience of explanation the word "optical" is used herein to represent any and all such acoustic and EM signals and the words "filter" or "filters" are used herein to represent any and all of the components desired to be rapidly inserted and removed from such a path. The most common arrangement in the prior art for temporarily introducing filters is by means of a rotating filter-wheel assembly. A circular array of filters is often provided, rotating around a shaft or pivot to the side of the optical path such that a circle drawn through the centers of the filters passes through the center of the optical path. As the filter-wheel rotates, different filters are introduced into and removed from the optical path. A limitation of this approach is that the filters must be introduced sequentially according to the order in which they have been placed on the filter-wheel. This is a significant limitation where random rather than sequential filter changes are needed.

Another approach used in the prior art is to provide a stack of filters arranged one behind the other off to the side of the optical path. Each filter is coupled to a rotating arm. When actuated the arm flips the filter into or out of the optical path. While this arrangement permits random filter selection it is bulkier and usually heavier than desired because of the need for a separate rotating actuation arm for each filter.

Accordingly, it is desirable to provide an improved filter insertion means and method that overcomes some or all of the limitations of the prior art. In particular, it is desirable that the filter transport apparatus be simple, rugged and reliable, not require rotating wheels or arms and the like for insertion and removal, and be able to provide random filter selection. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for rapidly moving a filter or other component IN and OUT of an optical or acoustic beam. The apparatus comprises a shuttle carrying the filter or other component at a first end and first and second spaced apart pieces of magnetic material near the other end. A low friction guide-way moveably supports the shuttle. A base supports the guide-way and supports a third magnetic piece and a first coil preferably located between the first and second pieces. When the shuttle is IN the first and third pieces form a first magnetic latch to releasably hold it IN and when the shuttle is OUT the second and third pieces form a second magnetic latch to releasably hold it OUT. One or more springs between the shuttle and the base store energy when the shuttle is IN or OUT. Activating the first coil weakens the magnetic attraction between the latch pieces, freeing the shuttle to move, driven by the one or more springs to the opposite OUT or IN position. A second coil and armature coupled between the base and the shuttle are desirably provided to aid in resetting the shuttle to the IN or OUT position from any in-between position.

A method is provided for rapidly moving a filter or other component into and out of an optical or acoustic beam. In a first embodiment, the method comprises determining whether the shuttle is IN, in-between or OUT. If IN, then sending a first signal to the first coil to release the first magnetic latch and move the shuttle OUT, or if in-between sending a second signal at least to the second coil to move the shuttle OUT. Before, during or after the determining and sending steps, receiving a command directing positioning of the shuttle IN or OUT, and if the command is for OUT, since the shuttle is already OUT repeating the receiving step, or if the command is for IN, sending another signal to the first coil to release the second magnetic latch and thereby move the shuttle to the IN position. In a preferred embodiment, after sending the first signal, checking the shuttle position to determine whether or not the shuttle has moved to the OUT position, and if not, issuing an error report and if so, proceeding to the receiving step. Similarly, after sending the another signal to move the shuttle IN, checking to determine whether the shuttle has moved to the IN position and if not, issuing an error report and if so, returning to the receiving step or locating step. In another embodiment, after determining whether the shuttle is IN or OUT or in-between, if IN or OUT, the actual shuttle position is stored and compared with the commanded position and if different a move shuttle command is issued to relocate the shuttle to agree with the commanded position.

BRIEF DESCRIPTION OF THE DRAWINGS

The present invention will hereinafter be described in conjunction with the following drawing figures, wherein like numerals denote like elements, and FIG. 1 is a simplified plan view of a rapid insertion assembly of the present invention showing internal construction features and with the filter shuttle in a neutral position;

FIG. 2 is a partial cut-away and cross-sectional view of the rapid insertion assembly of FIG. 1, at the location 2-2 indicated thereon;

FIG. 3 is an end view of the rapid insertion assembly of FIG. 1;

FIG. 4 is a cross-sectional view of the rapid insertion assembly of FIG. 1, at the location 4-4 indicated thereon;

FIG. 5A is a plan view and FIG. 5B a right side view of the rapid insertion assembly of FIG. 1 with the filter shuttle in a retracted position;

FIG. 8A is a plan view similar to FIG. 1 but of a rapid insertion mechanism according to a further embodiment of the present invention and FIG. 8B is a side view of the mechanism of FIG. 8A;

FIG. 9A is a plan view similar to FIG. 8A but of a rapid insertion mechanism according to a still further embodiment of the present invention and FIG. 9B is a side view of the mechanism of FIG. 9A;

DETAILED DESCRIPTION

Figure 6A:
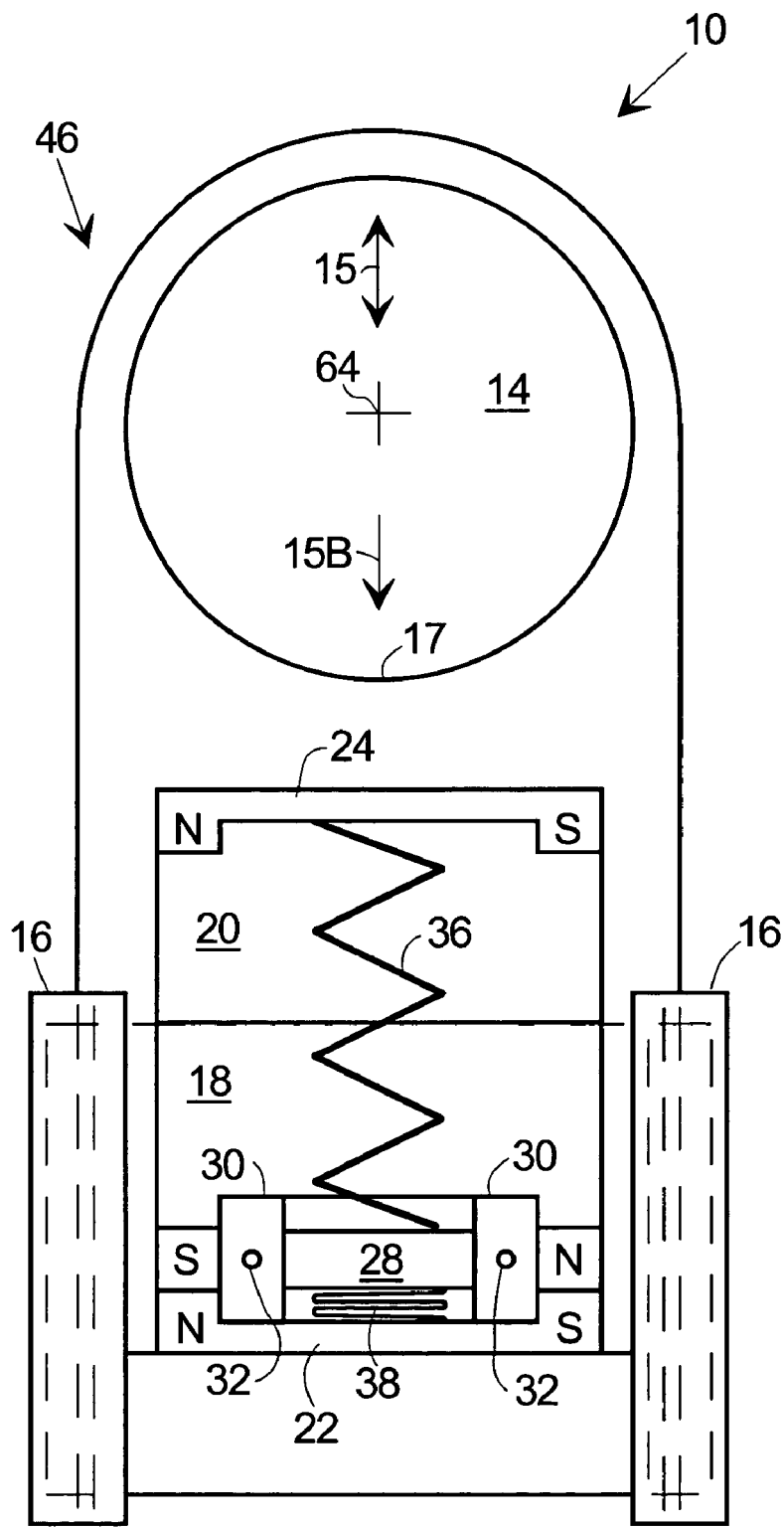
FIG. 6A is a plan view and FIG. 6B a right side view of the rapid insertion assembly of FIG. 1 with the filter shuttle in an extended position.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein, the words "keeper" and "pole piece(s)" are used interchangeably and refer to materials that are magnetic (e.g., have a magnetic high permeability) but do not retain significant permanent magnetism in the absence of a magnetic field. With respect to materials that are magnetic, ferromagnetic materials are preferred. Where such magnetic materials exhibit permanent magnetism in the absence of an external magnetic field, they are generally referred to as "magnets" and where they do not permanently exhibit such permanent magnetism, they are generally referred to as keepers or pole pieces or merely magnetic materials.

FIG. 1 is a simplified plan view, FIG. 2 is a partial cut-away and cross-sectional view, FIG. 3 is an end view and FIG. 4 is a further cross-sectional view, of rapid insertion assembly 10 of the present invention. The cross-sectional views of FIGS. 2 and 4 are at locations 2-2 and 4-4 respectively, indicated on FIG. 1. Rapid insertion assembly 10 comprises moveable shuttle 12 having region or aperture 14 in which the filter (i.e., any component) desired to be introduced into the optical or acoustic beam is placed. While filter mounting region or aperture 14 is shown as being substantially circular in plan view, this is merely for convenience of explanation and not intended to be limiting Region or aperture 14 can have any convenient shape. Shuttle 12 conveniently slides in preferably but not essentially U-shaped guide-ways or tracks 16, in the direction shown by arrow 15. Guide-way tracks 16 are supported and held in substantially parallel alignment by base 18. Interfaces 13 between shuttle 12 and guide-way tracks 16 are desirably low friction interfaces to permit shuttle 12 to slide in guide-way tracks 16 with little applied force. Magnetic levitation may be used between shuttle 12 and guide-way tracks 16 to minimize or avoid friction at interfaces 13. Linear bearings are a further example of suitable low friction arrangement. Persons of skill in the art will understand how to provide a low friction guide-way for shuttle 12 in guide-way tracks 16 or equivalent. Shuttle 12 desirably but not essentially has cut-out region 20 located generally at the distal end of shuttle 12 opposite to filter mounting location 14. Generally U-shaped pole pieces or bar magnets 22, 24 are mounted in shuttle 12 at opposite ends of cutout region 20, with the U-shaped regions facing each other. Pole pieces or magnets 22, 24 have their respective poles spaced distance 23 apart and are attached to and move with shuttle 12. Appropriate magnetic polarities, e.g., north (N) and south (S), are indicated thereon. Persons of skill in the art will understand that where 22, 24 are merely pole pieces or keepers, then the indicated magnetic polarities are induced when pole pieces or keepers 22, 24 move into proximity with magnet 28, as explained below. Located within region 20 and attached to portion 26 of base 18 is subassembly 34 comprising coils 30 and magnet 28 with relative N-S magnetic polarities as indicated. Bar or pellet shaped magnet(s) 28 may be a single magnet or multiple magnets and coils 30 may be a single coil or multiple coils. Either arrangement is useful. The magnet(s) and coil(s) should share a common magnetic axis. The respective poles of magnet 28 conveniently have dimension 29 in the direction of arrow 15. It will be appreciated that the N-S magnetic polarities of magnet 28 are opposite those of pole pieces or magnets 22, 24. As shuttle 12 moves within guideways 16, pole pieces or magnets 22, 24 move with shuttle 12 but subassembly 34 comprising magnet 28, coils 30 with coil contacts 32 remains fixed to base 18.

Springs 36, 38 provide return forces when shuttle 12 is perturbed with respect to sub-assembly 34 from the equilibrium (neutral) position shown in FIGS. 1-4. It is desirable that springs 36, 38 be resonant springs in combination with shuttle 12 but this is not essential. While two springs 36, 38 are preferred, it will be appreciated that in some embodiments only a single spring may be used. Further while springs 36, 38 are illustrated as being coil-type springs mounted substantially coaxially with direction 15 this is not essential. For example, springs 36, 38 may be off-set from the plane and/or center-line of shuttle 12. Further, springs 36, 38 need not be coil-type springs. Leaf-type springs may also be used, for example, oriented at substantially right angles to shuttle motion direction 15. The present invention is hereafter described as using coil-type springs 63, 68 but this is not intended to be limiting and is merely for convenience of explanation. Persons of skill in the art will understand based on the description herein that many different spring arrangements (e.g., coil, leaf, torsion, etc.) may be used and are intended to be included within the scope of the present invention.

Figure 6B:
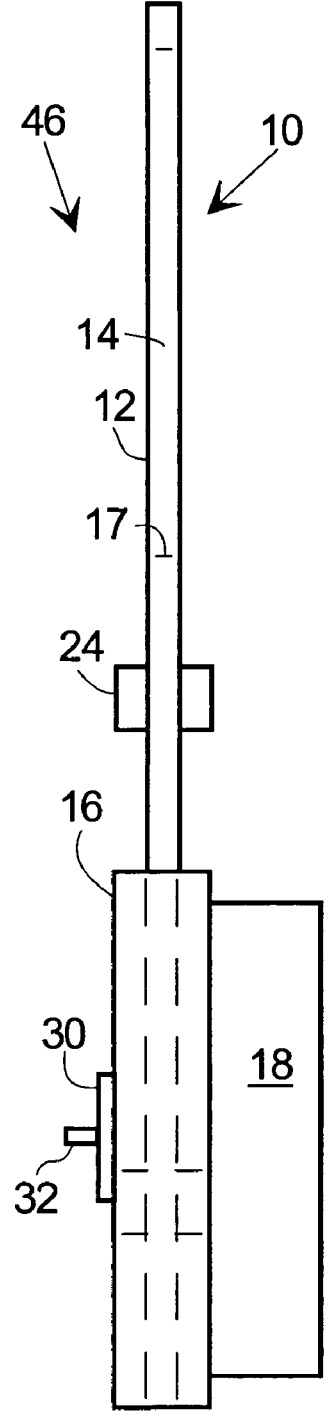

FIGS. 5A and 6A are plan views and FIGS. 5B and 6B are right side views of rapid insertion assembly 10 of FIG. 1 with shuttle 12 in different positions with respect to guide-ways 16 and base 18. In FIGS. 5A-B, shuttle 12 is in retracted position 44, that is, with filter mounting region 14 removed from the optical path. Spring 36 is compressed and spring 38 is extended. Pole piece (or magnet) 24 is in contact with magnet 28 with opposite magnetic polarities facing each other. In this condition, shuttle 12 is magnetically latched in retracted position 44. In FIGS. 6A-B, shuttle 12 is in extended position 46, that is, with filter mounting region 14 encompassing optical path 64. Spring 38 is compressed and spring 36 is extended. Pole piece (or magnet) 22 is in contact with magnet 28 with opposite magnetic polarities facing each other. In this condition, shuttle 12 is magnetically latched in extended position 46. Since magnet 28 is a permanent magnet and pole pieces or "keepers" 22, 24 are magnetic, shuttle 12 will remain latched in either extended position 46 or retracted position 44 until the holding magnetic force is released. This is accomplished, for example, by supplying a brief pulse of electrical current to coils 30 via contacts 32, of such a direction to momentarily partially overcome the magnetic field of magnet 28. As soon as the magnetic attraction of magnet 28 is reduced, springs 36, 38 drive shuttle 12 to its opposite extreme position where it is captured by the opposing magnet-keeper combination. In the preferred embodiment, piece 28 is the permanent magnet and pieces 22, 24 are merely magnetic pole pieces or keepers. This is preferred because in either latched position, magnet 28 is shorted by the respective pole piece or keeper 22 or 24. However, the preferred arrangement can be magnetically inverted. That is, pieces 22, 24 can be permanent magnets and piece 28 can be the "keeper." Either arrangement works. In either case, in order to release the magnetic latch, coils 30 only need to provide a magnetic field sufficient to weaken the magnetic attraction holding the magnet-keeper combination together against the force of springs 36, 38, that is, to weaken the field of magnet 28 in contact with keeper 22 or 24 or weaken the field of magnet 22 or 24 in contact with keeper 28. If all of pieces 22, 24 and 28 are permanent magnets, then coils 30 must provide a larger magnetic pulse to cause the magnetic latch to release, but this arrangement is not precluded.

For convenience of explanation, it is assumed in the following discussion that piece 28 is a permanent magnet and that pieces 22, 24 are keepers, but persons of skill in the art will understand based on the description herein that these roles may be reversed or that all three pieces 22, 24, 28 may be magnets. Referring now to FIGS. 5A-B where shuttle 12 is shown in retracted position 44, pulsing coils 30 releases the magnetic latch formed by magnet-keeper combination 24, 28. Compressed spring 36 and extended spring 38 then rapidly accelerates shuttle 12 in direction 15A. When shuttle 12 reaches the midpoint of its journey as illustrated in FIG. 1, the spring forces are balanced, but the momentum acquired by shuttle 12 during the first half of its flight is sufficient to compress spring 38 and extend spring 36 bringing shuttle 12 to extended position 46 shown in FIGS. 6A-B, where magnet-keeper combination 22, 28 latches, thereby capturing shuttle 12 in extended position 46. The opposite occurs when starting in extended position 46. Pulsing coils 30 to briefly reduce the field of magnet 28, releases magnet-keeper latch combination 22, 28 and compressed spring 38 and extended spring 36 force shuttle 12 in direction 15B where it is captured by magnet-keeper combination 24, 28 which latches it in retracted position 44. Thus, assembly 10 is a bi-stable fast insertion and retraction mechanism that changes state in response to brief current pulses directed through coils 30. The current pulses are shorter than the shuttle flight time so that when opposed keeper 22 or 24 on shuttle 12 reaches magnet 28, the flux canceling pulse has subsided and magnet 28 is once again capable of latching against keeper 22 or 24. If pieces 22, 24 as well as piece 28 are magnets then if the pulse current through coils 30 is increased sufficiently, the permanent magnetic flux of magnet 28 is cancelled and flux reversal takes place, that is, the N-S magnetic polarity of magnet 28 is reversed. Under these circumstances, a repulsive magnetic force can occur. This repulsive force further accelerates shuttle 12, giving it an extra impetus toward its opposite position. In this manner any energy loss from spring flexure is overcome by the additional energy supplied by coils 30. While coils 30 are shown as surrounding magnet 28, this is not essential. Coils 30 may be located in any configuration that permits the magnetic latching force provided by the permanent magnets (e.g., 28 and/or 22, 24) to be overcome by sending a current pulse through coils 30. Further while two coils 30 are convenient, this is not essential and one or more coils may be used.

Referring again to FIG. 1, filter region opening 14 is of dimension 11 in direction 15 and shuttle 12 has dimension 13 in direction 15 from inboard edge 17 of filter mounting region 14 to outboard edge 19 of shuttle 12. In order for shuttle 12 to retract completely from the optical path, then shuttle 12 should move inwardly by the amount of dimension 13 or by the width of the optical path. For this circumstance, spacing 23 between faces 50, 52 of magnets 22, 24 should be such that the magnitude of spacing 23 less thickness 29 of magnet 28 is equal or greater than dimension 13 or the width of the optical path. This allows shuttle 12 with filter mounting region 14 to be fully inserted and retracted.

Figure 7:
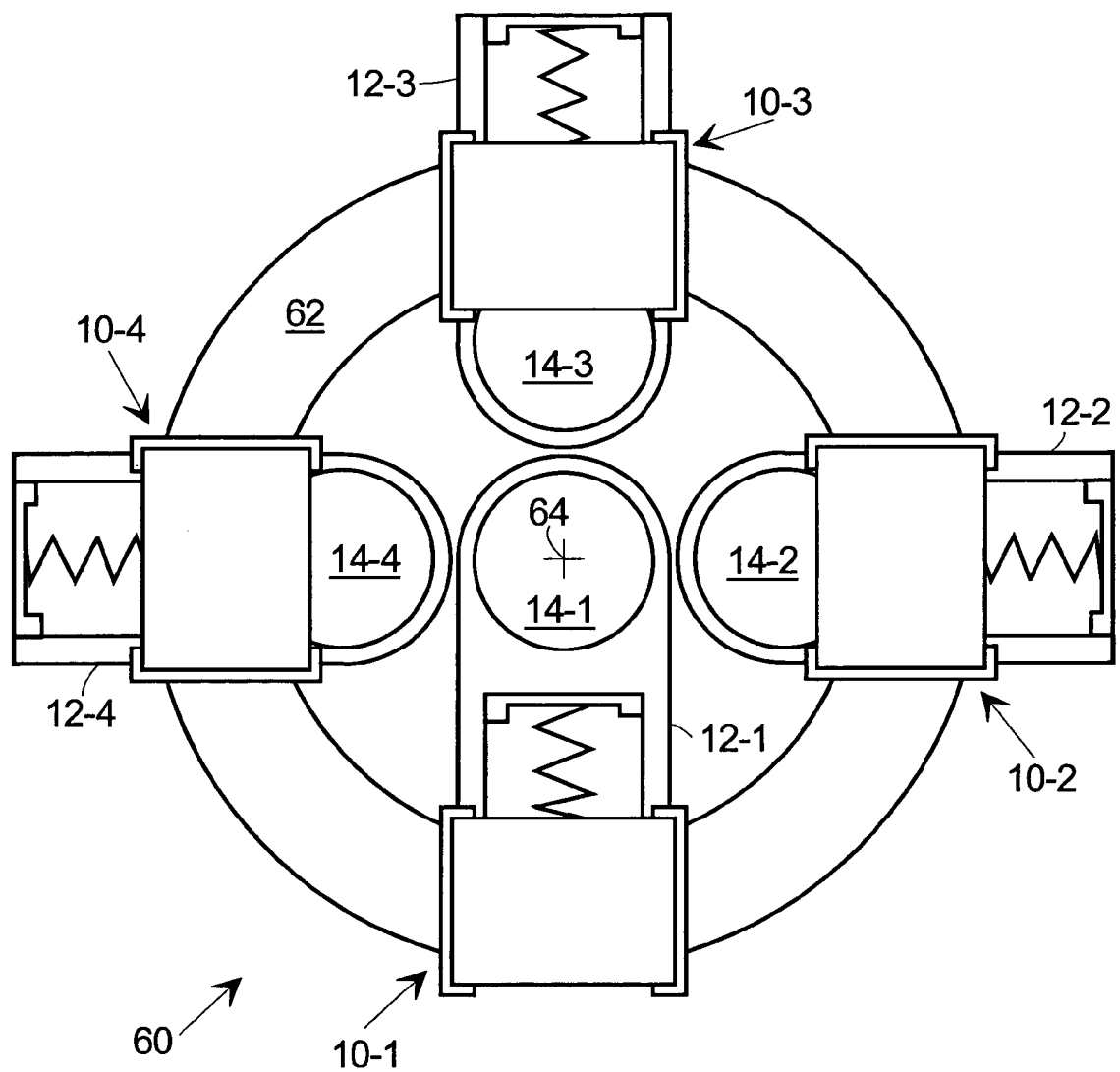
FIG. 7 is a simplified plan view of an array of rapid insertion assemblies, according to the present invention.

FIG. 7 is a simplified plan view of array 60 of fast insertion assemblies 10-1, 10-2, 10-3, 10-4, each of the type shown in FIGS. 1-6. Assemblies 10-1, 10-2, 10-3, 10-4 are supported in or on frame 62 around optical path 64. Shuttle 12-1 and filter region 14-1 of assembly 10-1 is shown as being latched in the extended position with optical path 64 centered in filter region 14-1. Assemblies 10-2, 10-3, 10-4 are latched in the retracted position. By pulsing control coils 30 of the appropriate assembly, any one of the filters mounted on assemblies 10-1, 10-2, 10-3, 10-4 can be rapidly and randomly inserted or removed from optical path 64. While only four assemblies 10-1, 10-2, 10-3, 10-4 are shown in array 60, persons of skill in the art will understand that more or fewer fast insertion assemblies may be placed in array 60, so long as adjacent assemblies do not interfere. While array 60 is shown as being substantially circular with the shuttle assemblies mounted symmetrically around the circle, this is merely for convenience of explanation and not intended to be limiting. Array 60 can have any convenient shape that locates the individual fast insertion assemblies where their shuttles can move in and out of the optical beam without interfering with each other. Further, the shuttle assemblies can be mounted at different locations and at any convenient angle in whatever way best accomplishes the particular task faced by the system designer. Also, it is not necessary that the various shuttle assemblies (e.g., 10-1, 10-2, 10-3, 10-4, etc.) lie in the same plane. For example, shuttle assemblies 10-1, 10-2, 10-3, 10-4 can be at different heights perpendicular to the plane of FIG. 7 so that several can be inserted at the same time without interference. There can be further shuttle assemblies mounted below as well as above frame 62. By locating various shuttle assemblies so that their shuttles lie in different planes, the number of shuttle assemblies that can be mounted in a compact non-interfering array can be increased.

FIG. 8A is a view similar to FIG. 1 but of rapid insertion mechanism 78 according to a further embodiment of the present invention, and FIG. 8B is a side view of mechanism 78 of FIG. 8A. Mechanism 78 comprises rapid insertion assembly 10 according to FIGS. 1-6 combined with reset drive mechanism 80. Reset drive mechanism 80 comprises generally rod shaped armature 82 that is conveniently coupled to pole piece 22 of shuttle 12. Armature 82 passes slideably through electromagnetic coil 84 having electrical contacts 86. Coil 84 is supported on base portion 88 coupled to base 18 of assembly 10. One or more position monitoring devices 90 are conveniently provided on base 10 for determining the position of shuttle 12 in assembly 10, that is, in retracted position (see FIGS. 5A-B, 7), in inserted position (see FIGS. 6A-B, 7), in neutral position (see FIGS. 1-2), or in some intermediate position depending upon the needs of the designer. Position monitoring device 90 may be located on base 18, 88 or on tracks 16 or on shuttle 12. Either arrangement is useful. While only one position monitoring device 90 is visible in FIG. 8, this is not intended to be limiting and persons of skill in the art will understand that multiple position monitoring devices may be placed at any convenient location on the base, track, shuttle or elsewhere. Alternatively, one position monitoring device capable of measuring the position of shuttle 12 with respect to frame 16, or base 18 or other suitable reference may be used. Position monitoring devices are well known in the art.

While armature 82 is illustrated as being a generally rod-shaped device, this is not intended to be limiting and any other convenient shape may also be used. Armature 82 is conveniently made from magnetic material so that it responds to the magnetic field produced by reset coil 84. When a pulse is applied to reset coil 84 via contacts 86, the current flowing through reset coil 84 creates a transient magnetic field that, for example, exerts an attractive force on armature 82 causing it to move in direction 83, that is, to pull shuttle 12 into the retracted position shown in FIGS. 5A-B where it is captured by the magnet-keeper combination 28, 22 or 22, 28. As previously discussed, shuttle 12 remains in the latched (retracted) position until coil(s) 30 are pulsed thereby breaking the magnetic latch and sending shuttle 12 toward the extended position shown in FIG. 6A-B. Thus, by use of reset drive mechanism 80, shuttle 12 may be moved from the neutral or other intermediate position into a latched position. Depending upon the needs of the designer or user, either latched position may be adopted as the "park" position, that is, the position where shuttle 12 is ordinarily stored while awaiting the next repositioning command.

While reset drive mechanism 80 is illustrated as comprising drive coil 84 mounted on base 80, 18 and armature 82 directly coupled to shuttle 12, this is not intended to be limiting. Any type of mechanism for pulling or pushing shuttle 12 away from the neutral position toward or into one of the latched positions may be used. non-limiting examples are: a rotary armature coupled to shuttle 12 by a linkage like a crank; a solenoid with a plunger coupled to shuttle 12 by appropriate push or pull levers or arms; a spool and thread or wire arrangement that pulls shuttle 12 toward or into one of the latched positions, and so forth. These arrangements are all capable of positive displacement of shuttle from the neutral position toward or into one or the other of the latched positions.

It is not necessary that reset drive mechanism 80 be able to pull (or push) shuttle 12 from the neutral position of FIGS. 1-2 entirely into the latched position of FIGS. 5A-B and 6A-B. It merely needs to start the shuttle in one direction or the other. By applying a further pulse to coil 84 each time shuttle 12 passes through the neutral position in the correct direction, the amplitude of oscillation of shuttle 12 around the neutral position will increase. By providing a series of appropriately timed pulses the amplitude of oscillation will increase until one of the keeper-magnet combinations latches. Once shuttle 12 is latched in a first position, it may be transferred to the other bi-stable position through normal operation. Reset drive mechanism 80 can also be used to unlatch shuttle 12 from its retracted or extended positions by means of a current pulse through coil 84 of sufficient strength to break the hold of the keeper-magnet latch. Armature 82 may also include permanent magnets. Permanent magnets are especially useful where reset drive mechanism 80 employs a rotating armature and linkage (not shown) to move shuttle 12.

FIG. 9A is a view similar to FIG. 8A but of rapid insertion mechanism 78' according to a still further embodiment of the present invention, and FIG. 9B is a side view of mechanism 78' of FIG. 9A. Mechanism 78' and associated drive mechanism 80' of FIGS. 9A-B differ from that illustrated in FIGS. 8A-B in that assembly 34 within shuttle 12 is omitted and drive mechanism 80' provides both the shuttle reset and bi-stable capture and release functions. Referring now to FIGS. 9A-B, shuttle 12 is moveably supported in guide-way 16 and provided with one or more return springs 36, 38 already been described. As noted above, mechanism 34 (see FIGS. 1 through 8A-B) is omitted and springs 36, 38 extend between shuttle 12 and support 26' fixedly coupled to base 18. As shuttle 12 moves in direction 15 with portion 26' fixed to base 18, springs 36, 38 are compressed or extended. Similar to the arrangement in FIGS. 8A-B, coil 84 with contacts 86 is fixed to base portion 88 coupled to base 18. As before, armature 82 slideably moves through coil 84 in response to current pulses supplied to coil 84 through contacts 86. Armature 82 has fixedly mounted thereon, magnetic pieces 24', 22' that are analogous in function to pieces 24, 22 of FIGS. 8A-B. Coil 84 has mounted thereon, magnetic pieces 28A-B that are analogous in function to magnetic piece 28 of FIGS. 8A-B. The combination of magnetic pieces 22', 28B forms a first releasable bi-stable magnetic latch and the combination of magnetic pieces 24', 28A forms a second releasable bi-stable magnetic latches, analogous to those formed by magnetic pieces 22, 28 and 24, 28, respectively in FIGS. 1 through 8A-B. The previous discussion in connection with FIGS. 1 through 8A-B with respect to which of magnetic pieces 22, 24, 28 are permanent magnets and which are merely magnetic keepers also applies to magnetic pieces 22', 24', 28A, 28B of FIGS. 9A-B with appropriately arrangement magnetic polarities. Magnetic pieces 22', 24', 28A, 28B may be rectangular or circular in cross section. Magnetic shunt 28C may also be provided but this is not essential. In operation, applying one or more current pulses to coil 84 causes armature 82 and therefore shuttle 12 to move in or out until one or the other of bi-stable magnetic latches 22', 28B or 24', 28A engages, thereby capturing shuttle 12 in the IN or OUT position. The location of the shuttle may be determined by using position sensor(s) 90 as previously described. Once shuttle 12 is latched in either the IN or OUT position, applying a brief current pulse to coil 84 reduces the magnetic attraction of the corresponding bi-stable magnetic latch, and springs 36, 38 drive shuttle 12 to the other OUT or IN bi-stable position. Thus, the arrangement of FIGS. 9A-B provides for bi-stable operation of shuttle 12 as has been previously described, but with the advantage that bi-stable capture and release and shuttle reset functions are obtained using a single drive coil.

Figure 10A:
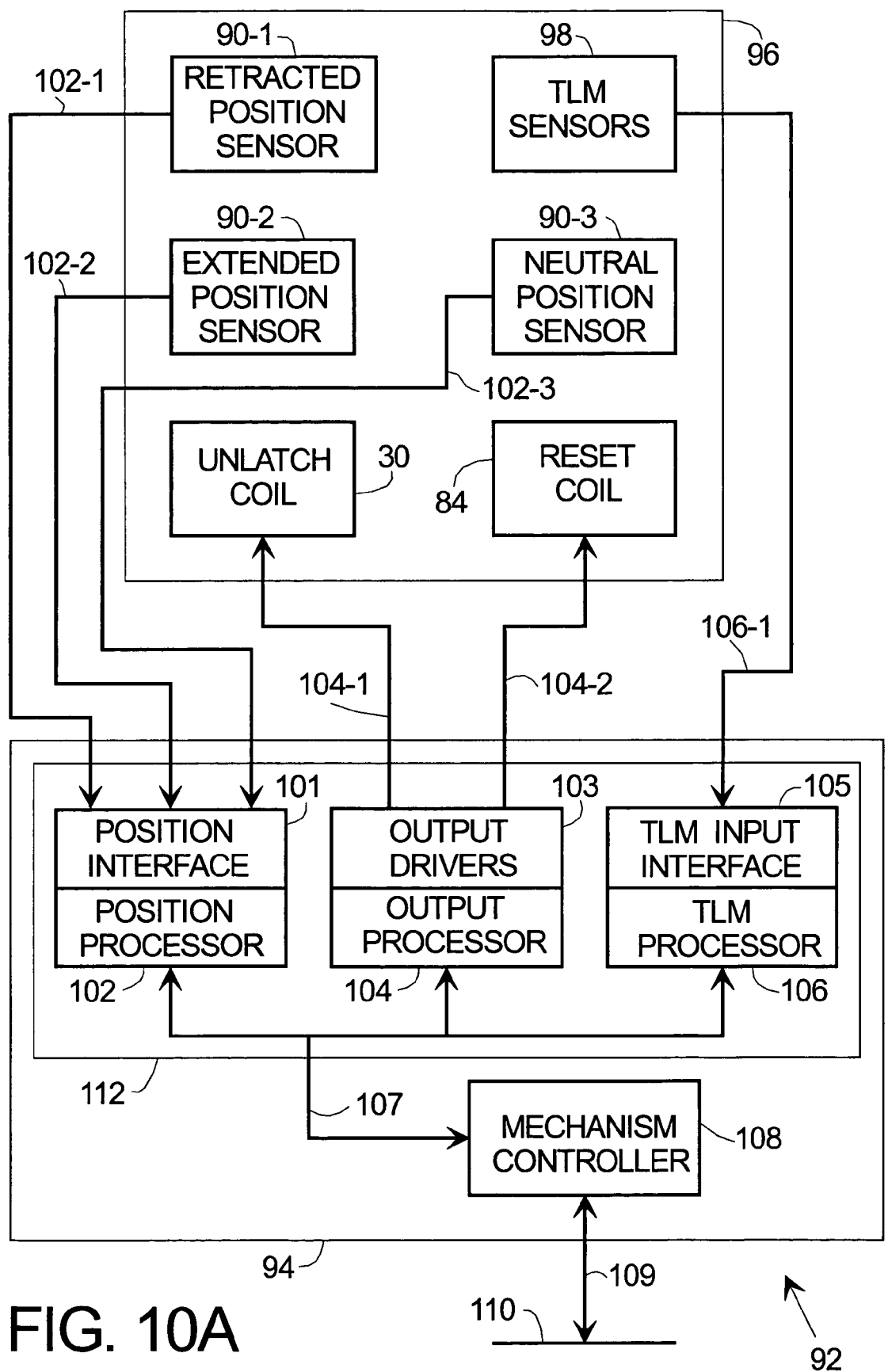
FIG. 10A is a simplified electrical schematic block diagram of a system employing a single rapid insertion assembly of the present invention and suitable for carrying out the method of FIG. 11.

FIG. 10A is a simplified electrical schematic block diagram of system 92 employing a single rapid insertion assembly 10, 78, of the present invention and suitable for carrying out method 200 of FIG. 11. System 92 comprises control function 94 and sensor-actuator function 96. Sensor-actuator function 96 is associated with rapid insertion assembly 10, 60, 78. Sensor-actuator function 96 comprises one or more position sensors 90-1, 90-2, 90-3 analogous to position sensor 90 of FIG. 9. Sensor 90-1 is preferably located so as to sense when shuttle 12 is in the retracted position (referred to as "OUT") such as is illustrated in FIGS. 5A-B. Sensor 90-2 is preferably located so as to sense when shuttle 12 is in the extended position (referred to as "IN") such as is illustrated in FIGS. 6A-B. Optional sensor 90-3 is preferably located so as to sense when shuttle 12 is in the neutral position (referred to as "NEU") illustrated in FIGS. 1-2.

Telemetry (abbreviated TLM) sensors 98 are desirable but not essential. TLM sensors 98 gather data on the state of the various sensors 90-1, 90-2, 90-3, etc. and actuators 30, 84, that is, the coils or other motors (collectively "coil" or "coils") that provide the magnetic pulses to move or latch/unlatch shuttle 12. Data measured by TLM sensors 98 can include temperature, voltage, current, and other information useful in assessing the "health" of the various components of assemblies 10, 60, 78. Techniques for remotely measuring such parameters and communicating them to a monitoring system are well known in the art. Actuator function 96 also includes coils 30, 84 that, as has been previously explained, cause shuttle 12 to move and latch and/or be released from a latch position.

Control function 94 includes position processor 102 with position input interface 101 that receives data from sensors 90-1, 90-2, 90-3 via buses or leads 102-1, 102-2, 102-3 respectively. Control function 94 also includes output processor 104 and associated output drivers 103 that provide the desired magnet drive currents to unlatch coil 30 over leads or bus 104-1 and to reset coil 84 over leads 104-2. Control function 94 also includes optional TLM processor 106 with associated TLM input interface 105 receives data from TLM sensors 98 via bus or leads 106-1. Control function 94 further comprises individual mechanism controller 108 that is coupled to position processor 102, driver output processor 104, and optional TLM processor 106 via bus or leads 107. Individual mechanism controller 108 is in turn coupled to outside system bus 110 via bus or leads 109.

Individual mechanism controller 108 performs the following functions:

- monitors the status of rapid insertion assembly 10, 60, 78 via one or more of sensors 90-1, 90-2, 90-3, 98, etc., and associated sensor processors 102 and 106 via their respective interfaces 101, 105;
- receives from external system bus 110 various commands directing that a particular shuttle be inserted or removed;
- provides the necessary commands to carry out those directions via driver output processor 104 and output drivers 103 to coils 30, 84;
- recovers from a temporary failure that causes shuttle 12 to drop out of either of its bi-stable IN/OUT states into the neutral state or other intermediate state;
- parks shuttle 12 in either IN, OUT or NEU position according to the needs of the system designer or user; and
- optionally issues execution confirmation reports and/or error reports to external bus 110 using data received from sensors 102-1, 102-2, 102-3 and 98 so that the external system of which rapid insertion mechanism 10, 60, 78 is a part can know the unit status.

Figure 11A:
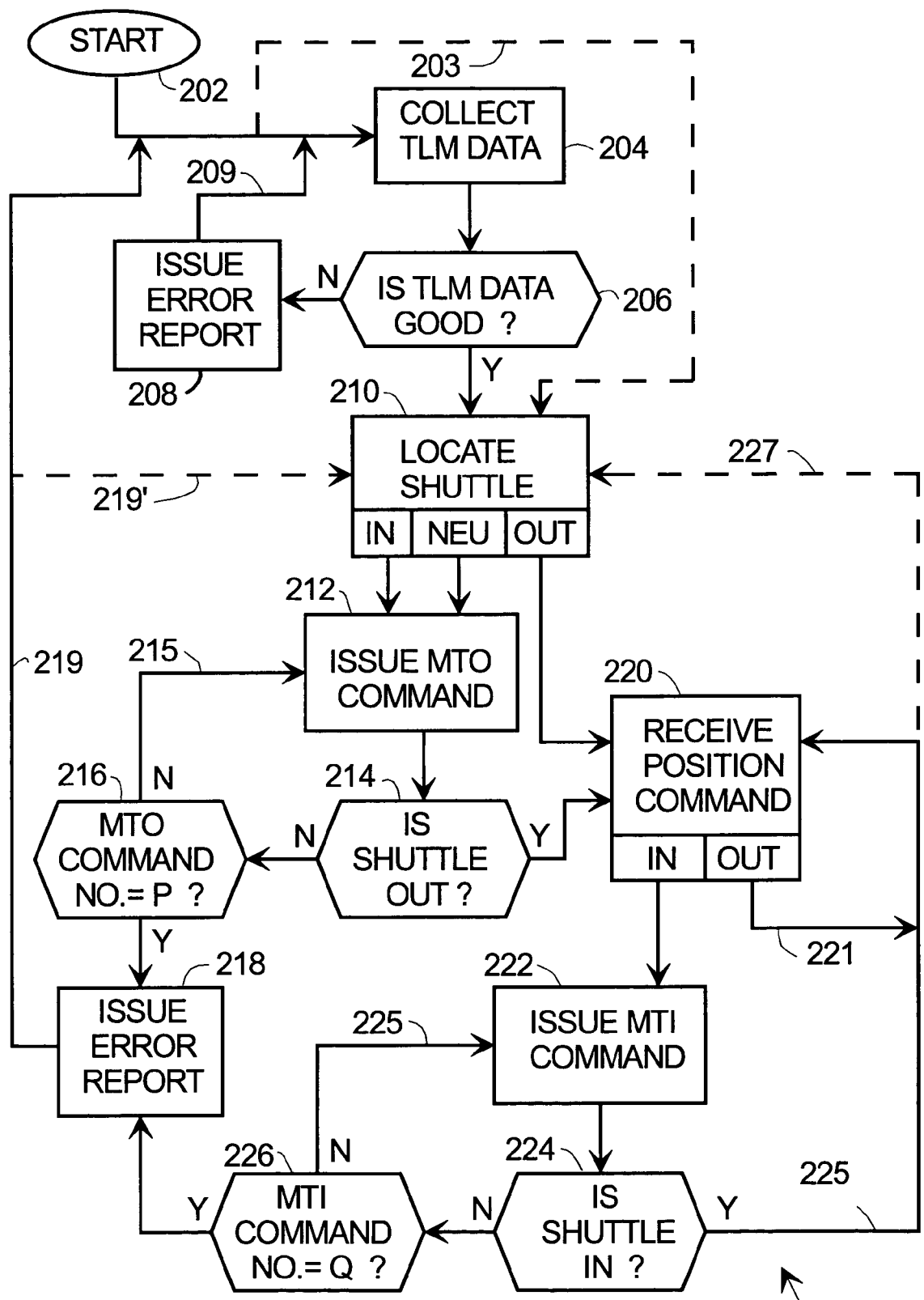
FIG. 11A is a simplified flow chart of the method of the present invention according to a first embodiment.
Figure 11B:
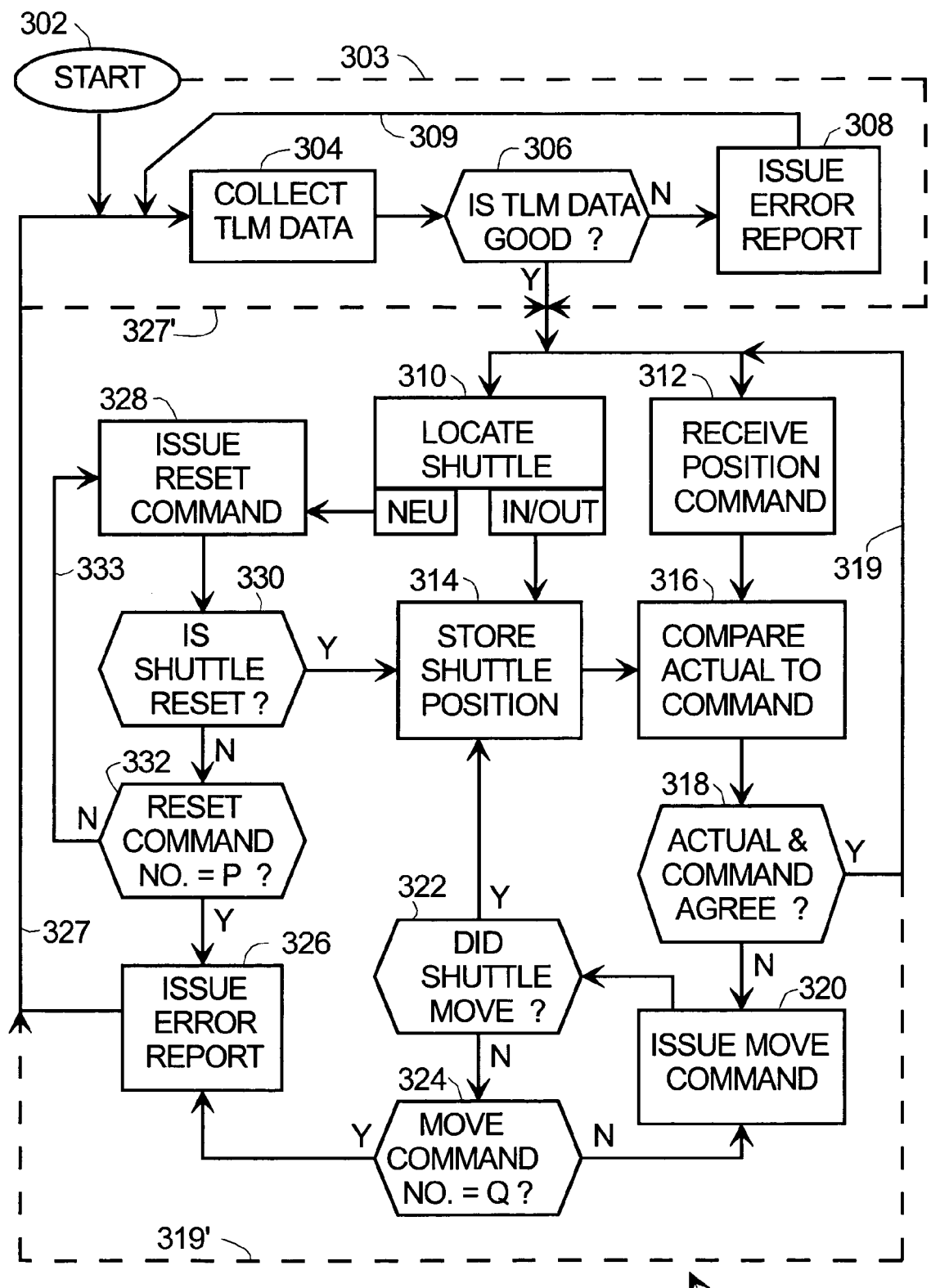
FIG. 11B is a simplified flow chart of the method of the present invention according to a further embodiment.

The above-described functions will be understood more fully by reference to the flow charts of FIGS. 11A-B.

Figure 10B:
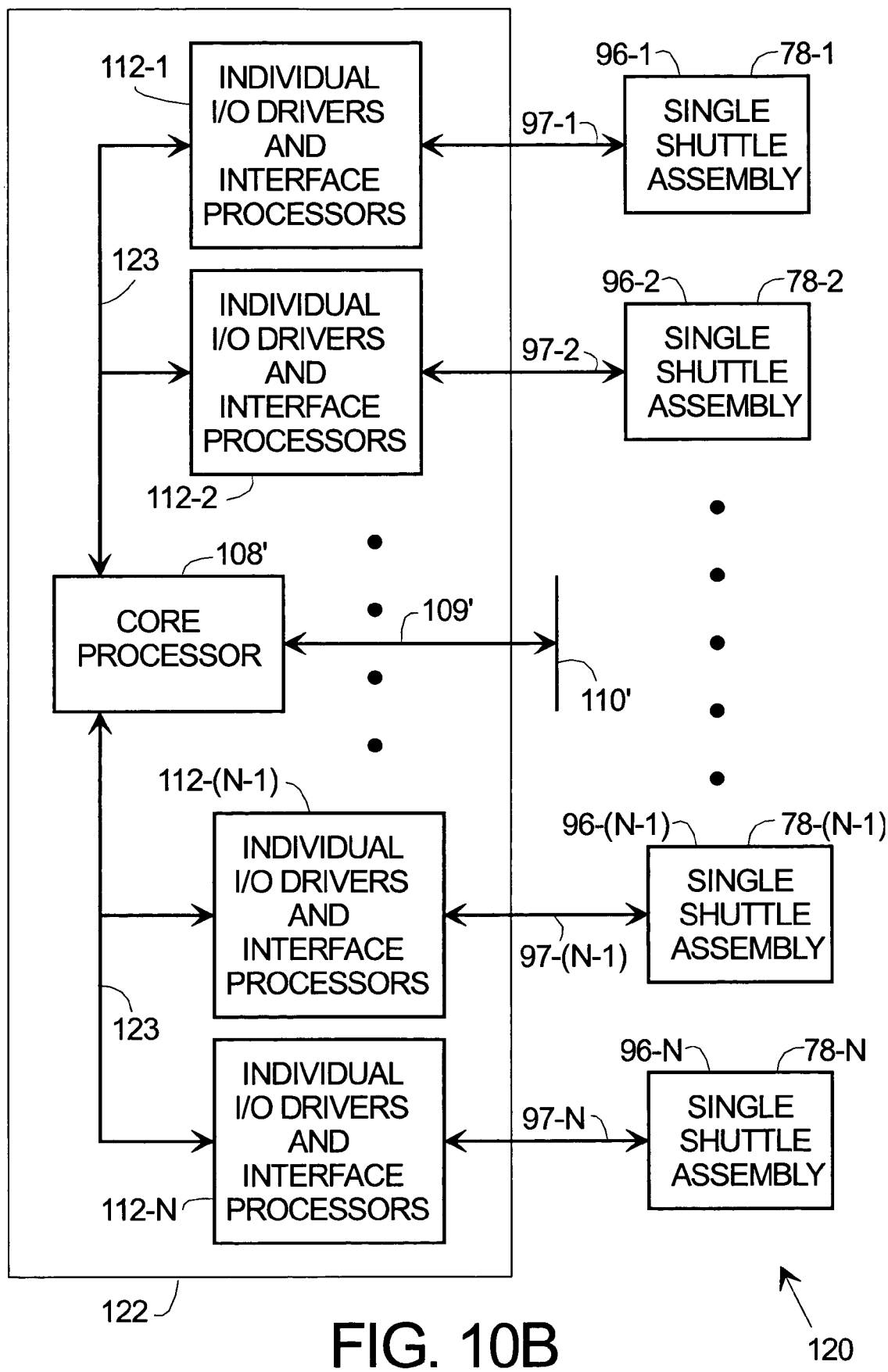
FIG. 10B is a similar diagram for multiple rapid insertion assemblies.

FIG. 10B a simplified electrical schematic block diagram of system 120 employing N>1 single rapid insertion shuttle assemblies of the present invention where N is the number of single rapid insertion assemblies, e.g., 10 and/or 78. For example, system 120 is suitable for controlling system 60 of FIG. 7. System 120 comprises multi-shuttle control function 122 and N single rapid insertion shuttle mechanisms 78-1 .... 78-N and their associated sensor-actuator functions 96-1 ... 96-N. Single shuttle assemblies 78-1 ... 78-N are described in connection with FIGS. 8-9 and associated sensor-actuator functions 96-1 ... 98-N are described in connection with FIG. 10A. System 120 comprises core controller 108' analogous to mechanism controller 108 of FIG. 10A. System 120 includes individual I/O driver and interface processors 112-1, 112-2 ... 112-N that are analogous to the combination of interface units 110-102, 103-104, 105-106 within outline 112 in FIG. 10A. There is one such unit 112-i for each rapid insertion shuttle 78-1, 178-2, ... 78-N and associated sensor-actuator function 96-1, 96-2, ... 96-N. Buses 97-1, 97-2, ... 97-N couple individual I/O drivers and interface processors 112-1, 112-2, ... 112-N to single shuttle assembly's sensor-actuator functions 96-1, 96-2, ... 96-N, respectively. Units 112-1, 112-2, ... 112-N are in turn coupled to core processor 108' by bus or leads 123. Core processor 108' is coupled to external command or input bus 110' via bus or leads 109', in much the same way as previously explained for the single shuttle control function of FIG. 10A. System 120 provides all of the functions previously described in connection with single shuttle system 92 of FIG. 10A, but for multiple shuttles. In addition to moving individual shuttles IN or OUT in response to movement requests or commands received from external bus or input 110', core processor 108' also monitors command request sequence and timing in order to preclude interference among different shuttles, thereby preventing jams or damage to the units.

FIG. 11A is a simplified flow chart of method 200 of the present invention according to a first embodiment. In FIGS. 11A-B, the abbreviation "Y" stands for "YES (TRUE)" and the abbreviation "N" stands for "NO (FALSE)" and the abbreviations IN, NEU and OUT represent the following: IN=extended position (in the optical path), NEU=neutral position in-between IN and OUT, and OUT=retracted position (out of the optical path) respectively. Method 200 begins with START 202 that desirably occurs on system power-up. Following START step 202, two options are available, that is, (i) proceeding via steps 204, 206, to step 210 or (ii) proceeding directly to step 210 as indicated by optional path 203. Option (i) is preferred wherein COLLECT TLM DATA step 204 is desirably but not essentially executed, in which mechanism controller 108 conveniently polls TLM processor 106 and interface 105 to retrieve the data being reported by TLM sensors 98. Query 206 follows wherein it is determined whether or not the retrieved TLM data corresponds to safe states or operating conditions. If the result of query 206 is NO (FALSE) then method 200 desirably but not essentially proceeds to step 208 wherein an error report is issued to controller 108 (e.g., from processor 106 to controller 108) and/or by controller 108 (e.g., from controller 108 to bus 110), and as shown by path 209, control returns to step 204. If the outcome of query 206 is YES (TRUE), then method 200 proceeds to step 210 wherein the shuttle position is determined using some or all of sensors 90-1, 90-2, 90-3 via position processor 102 and controller 108. If option (ii) is chosen method 200 proceeds directly from START 202 to step 210.

In the discussion that follows, it is assumed for convenience of explanation that the shuttle is desirably parked in the OUT position, but this is not essential. LOCATE SHUTTLE step 210 has three possible outcomes: extended (abbreviated "IN") as shown in FIGS. 6A-B and assembly 10-1 in FIG. 7, neutral (abbreviated "NEU") as shown in FIGS. 1-2, and retracted (abbreviated "OUT") as shown in FIGS. 5A-B and assemblies 10-2, 10-3, 10-4 in FIG. 7. If the outcome of step 210 is IN or NEU then method 200 proceeds to ISSUE MTO COMMAND step 212 where the abbreviation "MTO" stands for "move to OUT," that is, retract shuttle 12. Step 212 is desirably but not essentially followed by queries 214, 216. In query 214 it is determined whether the MTO command issued in step 212 was successful using one or more of sensors 90. If the outcome of query 214 is NO (FALSE) then method 200 desirably but not essentially proceeds to optional query 216 where it is determined whether the current number ("number" is abbreviated as "NO." in FIGS. 1A-B) of repetitions p of the MTO command equals a predetermined value P. If the outcome of optional query 216 is NO (FALSE) indicating that the MTO command should be repeated, method 200 conveniently loops back to step 212 as shown by path 215. If the outcome of query 216 is YES (TRUE) indicating that the predetermined number P of trials has been reached without success, then method 200 desirably proceeds to step 218 wherein an error report is issued and then as shown by path 219, control returns to start 202 and preferably step 204. If no TLM sensors are provided in sensor-actuator function 96 and steps 204-208 are omitted, then method 200 preferably returns to start 202 and step 210, as shown by alternate path 219'.

Returning now to query 214, if the outcome of query 214 is YES (TRUE) indicating that the MTO command succeeded in moving the shuttle to the OUT (retracted) position, then method 200 proceeds to RECEIVE POSITION COMMAND step 220 wherein system 92 awaits receipt of a position command, e.g., via external bus 110. While external bus 110 is a convenient means of providing such commands to system 92, any means of doing so may be used, as for example, a simple IN/OUT position switch (not shown) coupled to controller 108. Returning now to step 210, if the outcome of LOCATE SHUTTLE step 210 is "OUT" indicating that shuttle 12 is already in the OUT (retracted) position, then method 200 proceeds to RECEIVE POSITION COMMAND step 220.

The outcome of step 220 is either an IN command or an OUT command. Since this embodiment of method 200 insures that shuttle 12 is in the OUT position before step 220 is reached, if the command received is OUT, then shuttle 12 is already in the correct position and method 200 loops back to step 220 as shown by path 221 to await another position command or, alternatively via path 227 to step 210. Either arrangement is useful. When the outcome of step 220 is IN, then method 200 proceeds to ISSUE MTI COMMAND step 222 where the abbreviation "MTI" stands for "move to IN", that is move shuttle 12 to the inserted position as shown for example in FIGS. 6A-B and for assembly 10-1 of FIG. 7. Queries 224 and 226 are movement verification and repeat-allowed confirmation steps for the MTI command, analogous to steps 214, 216 for the MTO command, and the previous explanation applies here. If the number q of MTI commands is less than a predetermined number Q, then the MTI command is desirably but not essentially, repeated as shown by loop-back path 225. If the MTI command has failed to shift the shuttle to the IN position and q=Q, then method 200 proceeds to step 218 wherein an error report is desirably issued as before, and control returns to start 202 and step 204 or alternately to step 210 as shown by paths 219, 219', 203.

While method 200 has been described for the situation where OUT is assumed to be the "park" position, this is merely for convenience of explanation and not intended to be limiting. If the "park" position is IN rather than OUT or NEU rather than OUT then the corresponding substitution of terms should be made. For example, if "park" is IN then swap OUT for IN in method 200 of FIG. 1A. If "park" is NEU, then steps 212, 214, 216 follow step 220 rather than step 210. Persons of skill in the art will understand based on the description herein how to modify method 200 to suit their particular circumstances. While method 200 has been described for the situation where only one shuttle is being moved, persons of skill in the art will understand based on the description here that it also applies to the situation where multiple shutter assemblies are available and operating under the control of system 120.

FIG. 11B is a simplified flow chart of method 300 of the present invention according to a further embodiment. Method 300 begins with START 302 that desirably occurs on system power-up. Following START step 302, two options are available, that is, (i) proceeding via steps 304, 306, to steps 310, 312 or (ii) proceeding directly to steps 310, 312 as indicated by optional path 303. Steps 304, 306, 308 are substantially the same as steps 204, 206, 208 of FIG. 11A and the discussion thereof in connection with FIG. 11A is incorporated herein by reference. Either via steps 304, 306 or via path 303, method 300 proceeds to LOCATE SHUTTLE step 310 and RECEIVE POSITION COMMAND step 312. Step 312 may be performed anytime prior to step 316. Step 310 has two possible outcomes, either "NEU" or "IN/OUT" where "IN/OUT" indicates "either IN or OUT." If the outcome of LOCATE SHUTTLE step 310 is IN/OUT, then method 300 proceeds to STORE SHUTTLE POSITION step 314. In subsequent COMPARE step 316, the stored actual position is compared to the commanded shuttle position received from step 312 leading to query 318 wherein it is determined whether or not the actual shuttle position and the commanded shuttle position agree. If the outcome of query 318 is YES (TRUE) then method 300 preferably but not essentially returns to LOCATE step 310 and RECEIVE step 312 as shown by path 319. Alternatively, method 300 may return to START 302 as shown by paths 319', 327. If the outcome of query 318 is NO (FALSE) then method 300 proceeds to ISSUE MOVE COMMAND step 320 where system 92 or 120 or equivalent provides a current pulse to the appropriate latch release coil to send shuttle 12 to the opposite bi-stable position, e.g., if IN then to OUT or if OUT, then to IN. In verification query step 322 it is desirably but not essentially determined whether the shuttle has moved as commanded in step 320. If the outcome of query 322 is YES (TRUE) then method 300 desirably but not essentially loops back to STORE SHUTTLE POSITION step 314 where it can await a further positioning command from step 312. If the outcome of query 322 is NO (FALSE) then query 324 is desirably executed to determine whether or not the currently issued number q of MOVE commands equals a predetermined number Q. If the outcome of query 324 is NO (FALSE) then method 300 loops back to ISSUE MOVE COMMAND step 320, similar to what has been described in connection with analogous move steps in FIG. 11A. When the number of issued MOVE commands equals Q then the outcome of query step 324 is YES (TRUE), indicating that MOVE commands have been issued Q times without success, and method 300 desirably but not essentially proceeds to ISSUE ERROR REPORT step 326 and returns to START step 302 as indicated by path 327 or to LOCATE step 310 and RECEIVE step 312 as indicated by path 327'.

Returning now to LOCATE SHUTTLE step 310, if the outcome of step 310 is NEU, then method 300 proceeds to ISSUE RESET COMMAND step 328 wherein system 92 and/or 120 sends one or more current pulses to the appropriate actuator coil to cause shuttle 12 to move from the NEU position to either IN or OUT, as has been previously described in connection with FIGS. 8A-B and/or 9A-B. Verifications steps 330, 332 analogous to steps 214, 216 of FIG. 11A are executed to determine whether or not the RESET step was successful after one or more attempts. If the outcome of query 330 is YES (TRUE) then method 300 proceeds to STORE SHUTTLE POSITION step 314 where the reset location (either IN or OUT) is stored. If the outcome of query 330 is NO (FALSE) then method 300 proceeds to query 332 where it is determined whether a predetermined number P of RESET attempts has been unsuccessfully executed. If the outcome of query 332 is YES (TRUE) method 300 desirably but not essentially proceeds to ISSUE ERROR REPORT step 326 and returns to START 302 or LOCATE step 310 and RECEIVE step 312, as has been previously described. While method 300 of FIG. 11B does not indicate a preferred "park" position, persons of skill in the art will understand that such can be provided as illustrated in FIG. 1A. Persons of skill in the art will also understand that systems 92, 120 can use the shuttle position information for each shuttle stored in controllers 108, 108' or equivalent in step 314 to avoid interference among different shuttles capable of entering the same optical beam in the same location.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A rapid insertion assembly for placing and withdrawing a component to and from a predetermined location, comprising:
    a shuttle adapted to support the component proximate a first end, and having a second distal end with first and second pieces of magnetic material coupled thereto and spaced apart a predetermined distance;
    a guide-way supporting the shuttle, permitting the shuttle to move in a first direction between a first IN position where the component lies substantially in the location and a second OUT position where the component does not lie substantially in the location;
    a base for supporting the guide-way;
    a third magnetic piece and coil sharing a common magnetic axis, coupled to the base and located between the spaced-apart first and second pieces, so that when the shuttle reaches the IN position the first and third piece are in contact forming a first magnetic latch to releasably hold the shuttle in the IN position and when the shuttle reaches the OUT position the second and third pieces form a second magnetic latch to releasably hold the shuttle in the OUT position, wherein a magnetic pulse created by the coil causes either magnetic latch to release, freeing the shuttle from the IN or OUT position; and
    one or more springs coupled between the shuttle and the base, the one or more springs storing energy when the shuttle is in either the IN or OUT position, and transferring such stored energy to the shuttle when either magnetic latch is released, thereby causing the shuttle to move to the opposite OUT or IN position.

2. The assembly of claim 1 wherein the first and second pieces of magnetic material are keepers and the third piece of magnetic material is a permanent magnet.

3. The assembly of claim 1 wherein the first and second pieces of magnetic material are permanent magnets and the third piece of magnetic material is a keeper.

4. The assembly of claim 1 wherein the third piece of magnetic material comprises first and second portions, the first portion located at one end of the coil facing the first piece of magnetic material and the second portion located at an opposed end of the coil facing the second piece of magnetic material, the first piece and the first portion forming the first magnetic latch and the second piece and the second portion forming the second magnetic latch.

5. The assembly of claim 1 wherein the first and second pieces are substantially U-shaped with the open ends of the U's facing each other.

6. The assembly of claim 1 further comprising a second coil and a magnetic armature, one of which is coupled to the base and the other of which is coupled to the shuttle, so that, when a current pulse is applied to the second coil, the shuttle moves toward one of the IN or OUT positions.

7. A rapid insertion system, comprising:
    a shuttle movable between spaced-apart, first and second opposed bi-stable Positions;
    an optical filter carried by the shuttle, the optical filter residing within an optical path when the shuttle is in the first bi-stable position and outside of the optical path when the shuttle is in the second bi-stable position;
    one or more sensors for determining whether the shuttle is in the first or second bi-stable position;
    an assembly for providing an attractive magnetic force thereby forming a magnetic latch that releasably holds the shuttle in either the first or second bi-stable position;
    a first coil magnetically coupled to a portion of the assembly, wherein when the coil is provided with a sufficient current pulse, it generates a magnetic field that temporarily overcomes the attractive magnetic force forming the magnetic latch, thereby causing the magnetic latch to release;
    a controller electrically coupled to the one or more position sensors and to the first coil and having an external input, wherein the controller receives shuttle position data from the one or more sensors and a position change command via the external input, then if the commanded position is different than the current shuttle position, the controller supplies the sufficient current pulse to the first coil thereby causing the magnetic latch to release so that the shuttle transits to the opposite bi-stable position;
    a low friction guide-way supporting the shuttle;
    a base supporting the guide-way;
    one or more springs coupled between the shuttle and the base, adapted to store energy when the shuttle is in the first or second bi-stable position;
    first and second magnetic pieces coupled to the shuttle and spaced apart by a predetermined distance; and
    a third magnetic piece and coil sharing a common magnetic axis, the third magnetic piece located between the spaced-apart first and second magnetic pieces, the third magnetic piece cooperating with the first and second magnetic pieces to selectively latch the shuttle in the first and second bi-stable positions, respectively.

8. A method for moving a shuttle adapted to carry a filter between bi-stable first and second opposed end positions through an intermediate position, the shuttle having one or more position measuring devices, a first magnetic latch for releasably holding the shuttle in the first bi-stable position and a second magnetic latch for releasably holding the shuttle in the second bi-stable position, and one or more coils for releasing the bi-stable latches and moving the shuttle from the intermediate position to one of the first or second end positions, the shuttle having associated therewith TLM sensors adapted to provide data on the health of the one or more position sensors and the one or more coils, the method comprising:
    collecting data from the TLM sensors;
    comparing the collected data to predetermined constants to determine whether the states of the one or more position sensors and the first coil are good or bad;
    if the states are bad, repeating the TLM data collecting step;
    if the states are good, determining whether the shuttle is located in the first end position, the intermediate position or the second end position;
    if in the first or second end positions, storing the determined location or if in the intermediate position, placing the shuttle in one of the first or second locations and then storing the location;
    before, during or after the foregoing determining and storing steps, receiving a desired shuttle location command for the first or second position; and
    if the desired shuttle location is for the stored location repeating the receiving step, or if the desired shuttle location is not for the stored location, sending a signal to the one or more coils to release whichever magnetic latch is holding the shuttle and thereby move the shuttle to the desired shuttle location so as to: (i) remove the filter from an optical path if the shuttle is in the first end position, and (ii) insert the filter into the optical path if the shuttle is in the second end position.

9. The method of claim 8 further comprising after the comparing step, if the states are bad, issuing an error report before repeating the collecting step.

10. The method of claim 8 further comprising, after the sending step, checking the shuttle position to determine whether or not the shuttle has moved to the desired shuttle location, and if not, issuing an error report and if so, proceeding to the receiving step.

11. The method of claim 10 fun her comprising after the checking step, if the shuttle has not moved to the desired shuttle location then, before issuing the error report, repeating the sending step.

12. The method of claim 11 further comprising counting the number of times that the sending step has been repeated and if it exceeds a predetermined number, omitting further sending steps and issuing the error report.

13. The method of claim 8 further comprising prior to the receiving step, placing the shuttle in a predetermined park position.

14. An apparatus for rapidly moving a filter IN and OUT of an optical beam, comprising:
- first and second spaced-apart pieces of magnetic material;
- a third region of magnetic material and a coil, wherein the third region and the coil share a common magnetic axis;
- a shuttle that carries the filter proximate a first end and the first and second spaced-apart pieces of magnetic material near an opposite end;
- a low friction guide-way that supports the shuttle;
- a base that supports the guide-way and the third magnetic piece and coil, the third magnetic piece and coil being located between the first and second pieces;
- one or more springs coupled between the shuttle and the base, adapted to store energy when the shuttle is IN or OUT; and wherein, when the shuttle is IN the first piece and a first portion of the third piece form a first magnetic latch to releasably hold the shuttle IN and when the shuttle is OUT the second piece and a second portion of the third piece form a second magnetic latch to releasably hold the shuttle OUT, and activating the coil weakens the magnetic attraction within the magnetic latch, thereby freeing the shuttle to move, driven by the one or more springs, to the opposite OUT or IN position.

15. The apparatus of claim 14 wherein the first and second pieces are keepers and the third piece is a magnet.

16. The apparatus of claim 14 wherein the first and second portions of the third piece are separated with the coil in between.

17. A rapid insertion assembly for placing and withdrawing a component to and from a predetermined location, comprising:
- a base;
- a shuttle element translationally mounted in at least partially within the base and moveable between at least an extend position and a retract position;
- a first magnetic piece coupled to the shuttle element;
- a second magnetic piece coupled to the shuttle element and spaced apart from the first shuttle element;
- a third magnetic piece coupled to the base and disposed between the first and second magnets, the third magnet magnetically coupled to the first magnet when the shuttle element is in the extend position and magnetically coupled to the second magnet when the shuttle element is in the retract position; and
- one or more springs coupled between the shuttle element and the base and configured to (i) bias the shuttle element toward the extend position at least when the shuttle element is in the retract position and (ii) bias the shuttle element toward the retract position at least when the shuttle element is in the extend position.

* * * * *